UNITED STATES PATENT OFFICE.

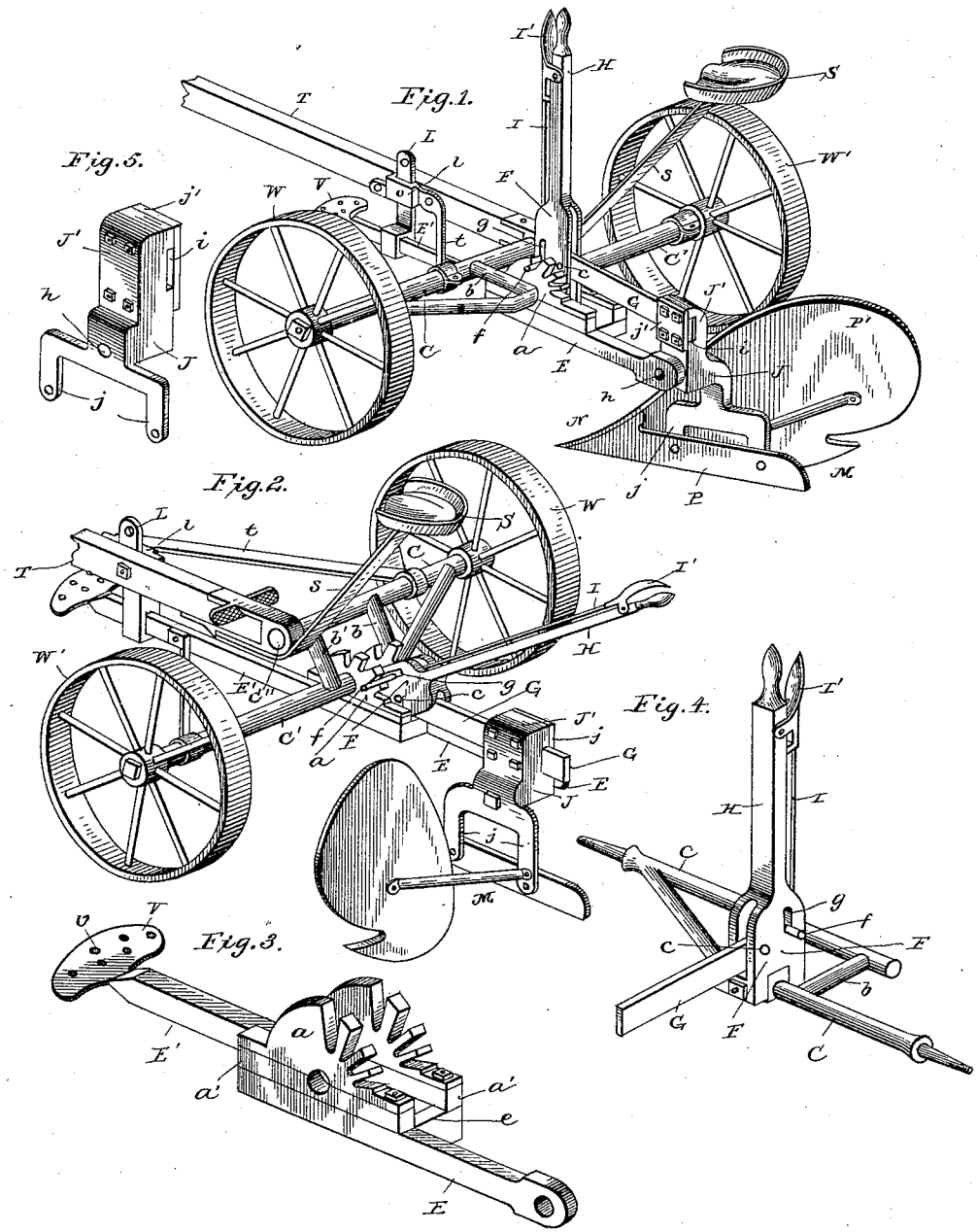

MARTIN SUGHROUE, OF PLEASANT VALLEY, ILLINOIS.

WHEEL-PLOW.

SPECIFICATION forming part of Letters Patent No. 430,046, dated June 10, 1890.

Application filed October 2, 1889. Serial No. 325,813. (No model.)

*To all whom it may concern:*

Be it known that I, MARTIN SUGHROUE, a resident of Pleasant Valley, in the county of Jo Daviess and State of Illinois, have invented certain new and useful Improvements in Wheeled Plows, which invention is fully described and explained in this specification and shown in the accompanying drawings, of which—

Figure 1 is a perspective view of a plow embodying my improvements, the parts being so connected and adjusted as to form a right-hand plow and the plowshare being raised to a position above the ground. Fig. 2 is a perspective view of the same plow, the parts being adjusted to form a left-hand plow, and the plowshare and one of the wheels W' being lowered to a position corresponding to the bottom of the furrow, while the other wheel W is in position to rest on the surface of the land. Fig. 3 is a perspective view of the plow-beam and the notched segments or ratchet-plates attached thereto. Fig. 4 is a perspective view of the axle of the plow and the tilting lever secured thereon. Fig. 5 is a perspective view of the plow-standard, the view thereof being the same as in Fig. 2.

In these views, W W' are two wheels of ordinary construction loosely mounted on the ends of an axle made up of two parallel parts C C', offset from each other for the purpose hereinafter explained and connected by integrally-formed transverse bars or webs $b\ b'$. The outer ends of the parts C C' of the axle are formed with suitably-reduced portions entering the hubs of the wheels and with shoulders forming stops for the inner ends of the hubs, and the wheels are secured in position by means of nuts engaging the projecting ends of the axle or in any other suitable manner. The inner end of the part C of the axle projects beyond the second transverse bar $b'$ and forms a gudgeon C'', on which is pivoted the rear end of a tongue T of any ordinary construction, the tongue being preferably stiffened by means of an oblique brace $t$, connecting the tongue with a point near the outer end of the part C of the axle. To the rear end of the tongue is secured a seat-support $s$, extending obliquely upward and backward, and on this support is fastened the seat S, of ordinary construction, the point of attachment of the support to the tongue being preferably made below the gudgeon C'', which is the pivotal point of the rear end of the tongue.

On that portion of the part C' of the axle which lies between the transverse bars $b\ b'$ is pivotally secured a plow-beam having the form illustrated in detail in Fig. 3, the entire beam being made up of two parallel members E E', which overlap each other, the overlapping ends being separated by a suitable space and held in this position of separation by blocks $e$, one of which is shown in Fig. 3. Upon the upper surface of the central portion of the beam thus formed are fastened two semicircular notched segments separated by the space between the overlapping parts of the beam on which they rest and so placed that they shall be concentric with that part of the axle on which the beam is pivoted. The beam, the toothed segments, and the axle may be secured together in any suitable manner; but I prefer the construction shown in Fig. 3, in which the blocks $a'$ are interposed between the segments and the members of the beam, suitably-journaled bearings for the axle being formed in the segments, and the blocks $a'$, the segments, the beam, and the interposed blocks being securely bolted together with the axle in place in the bearing thus formed. The end of the member E', which forms the front portion of the plow-beam, is provided with a horizontal clevis-plate V, preferably symmetrical with reference to the upper and lower faces of the beam, and provided with a series of holes $v$ for the lateral adjustment of the clevis, and on the inner face of the rear end of the member E of the beam is pivotally secured a plow-standard made up of a horizontal arm J, a vertical neck J', extending above the beam, and two parallel vertical bars $j$, extending downward from the horizontal arm, the entire standard being preferably formed in a single piece and being secured to the plow-beam by means of a bolt $h$, passing through the beam and through or into the horizontal arm J. The landside P of an ordinary plow is bolted to the inner face of the lower ends of the bars $j$, the mold-board being outside of said bars and being braced thereto in any suitable manner.

It will be understood from the foregoing description that the beam oscillates freely upon the axle upon which it is hung, and the plow-standard has only a pivotal connection with the beam by means of the horizontal bolt $h$.

On the portion of the axle between the segments A A is rigidly fastened a head F of a lever H, and in the head is formed a longitudinal slot $g$ for the reception of the movable transverse pin $f$, adapted to engage the notches in the segments $a$. This pin is connected by means of a rod I with a spring-actuated lever I', fastened to the lever H near its free end, the parts being so arranged that the pressure of the lever I' toward the adjusting-lever H withdraws the pin $f$ from engagement with the notches of the segments. The front end of a reciprocating tilting beam G is connected with the lever-head F by means of the transverse pivot $c$, and the rear end of said tilting beam lies in a slot or gain in the inner face of the neck J' of the plow-standard, and is held in place therein by means of a plate $j'$, bolted to the face of the neck. The tilting beam fits snugly in the slot thus formed, but is free to move longitudinally therein, the office of this element of the machine being simply to regulate the angular position of the plow-standard and plow with reference to the plow-beam E E', and the strain of draft upon the plow being borne entirely by said plow-beam. The front end of the member E' of the plow-beam lies in a vertical slot in an adjustable guard L, fastened to the tongue by means of the casting $l$ and a suitable bolt, the vertical height of the slot in the guard being sufficient to allow considerable vertical play of the beam. Within certain limits, therefore, the front end of the beam moves freely up and down, its position when the plow is in operation being regulated by the position of the plow proper and the line of draft.

Considering, now, the structure shown in Fig. 1, in which the two parts of the axle are in substantially the same horizontal plane, the lever H being approximately vertical and the plow P P' being somewhat above the level of the surface supporting the wheels, it is evident that a backward and downward movement of the free end of the lever will lower the inner end of the part C' of the axle and correspondingly raise the inner end of the part C, and that this change of position will bring each of the parts of the axle into an oblique position and will raise the rear end of the tongue and depress the rear end of the plow-beam. As the front end of the plow-beam remains at approximately the same height, the depression of the rear end thereof changes the position of the beam with reference to a horizontal plane and would correspondingly change the position of the plow-standard and plow if they were rigidly fastened to it. They are, however, as has already been said, pivotally connected to the plow-beam, their angular position with reference thereto being regulated by the tilting beam G. As the free end of the lever H moves backward and downward, the pivot $c$, which connects the lever-head with the front end of the tilting beam, has a corresponding movement, and thus depresses the front end of the tilting beam, and the relation of the distance between the parts C C' of the axle and the distance of the pivot $c$ from the pivot of the lever H is such that the tilting beam G passes through a series of approximately parallel positions. It is therefore possible, and I consider it preferable, to so arrange the parts that when the machine is in the position shown in Fig. 1 the tilting beam and the base of the plow shall be horizontal, and when the lever H is moved through its entire arc of movement, which is about ninety degrees, the tilting beam and the base of the plow shall still be horizontal. This horizontal position of the plow when in its lowest or ordinary working position is essential to its successful operation; but its position when raised above the ground is not so material. In fact, I have found it desirable to so arrange the guard L and its slot that when the plow is raised above the ground by raising the inner end of the part C' of the axle and correspondingly depressing the inner end of the part C the lowering of the tongue may press the front end of the beam E E' downward, thereby raising the heel of the plow above the point. It is evident that the rotation of the parts of the axle with reference to each other by means of the lever H, as above set forth, not only serves to depress the plow, but also in effect raises the wheel W above the wheel W' and adapts the former to run upon the land while the latter runs in the furrow. The operation of the single lever H therefore secures all necessary adjustment for the successful operation of the machine illustrated and described. It raises the one wheel any desired distance with reference to the other, and at the same time drops the plow a corresponding distance and adapts it to work at a proper depth corresponding to the relation between the wheels, and at the same time it operates the tilting beam as well as the plow-beam, and thereby preserves at all times the horizontal position of the base of the plowshare. When the parts are in working position, the strain of draft is borne entirely by the plow-beam proper, and as the front end and draft attachment of the plow-beam remain always at approximately the same height, no matter what the position of the plow may be, no vertical adjustment of the clevis is required to compensate for any change in the depth at which the plow is run.

In all wheeled plows heretofore constructed, so far as I am aware, the plow-beam has been in approximately the same vertical plane as the landside, and in foul land the tendency of the plow to clog by the accumulation of loose material in the angle between the beam and plowshare has been a serious inconvenience. By means of the horizontal arm J of the plow-standard shown in the drawings the plow is set completely at one side of that portion of the plow-beam with which it is immediately connected, and any loose material rising up on the front of the plowshare either passes completely over it or is thrown to one side, since it finds no angle in which to lodge. At the same time any side draft which might be occasioned by this offsetting of the standard is prevented by the offsetting of the two parts of the plow-beam, the vertical-bars $j\,j$ of the standard being approximately in the same vertical plane as the member E' of the beam.

The explanation of the operation of the machine so far given has been directed to the form illustrated in Fig. 1, which is a right-hand plow. The operation of the left-hand plow (illustrated in Fig. 2) is precisely the same, and this plow is made up of the same parts as shown in Fig. 1, except that a left-hand plowshare is substituted for the right-hand share shown in Fig. 1. In order to change the structure from the form shown in Fig. 1 to that shown in Fig. 2, it is necessary to disconnect the seat-support, the plow-beam, the toothed segments, the operating-lever, the tilting beam, and the plow standard from the tongue and axle and from each other. The wheels, axle, and tongue are then turned bottom upward, when they assume the position shown in Fig. 2. The other parts may then be replaced in their former positions and secured as before, the plow-beam being turned bottom upward and the plow-standard being placed on the left-hand side of the beam instead of on the right-hand side, and the attachment of a left-hand plowshare to the standard completes the reconstruction of the machine. The plow thus formed is in every respect the same as that illustrated in Fig. 1, except that it throws a left-hand instead of a right-hand furrow, and its operation is precisely the same as that of the plow shown in Fig. 1, as already fully explained.

Having now fully described and explained my invention, what I claim as new, and desire to secure by Letters Patent, is—

1. The combination, with the wheels W W', of the axle journaled therein and made up of the offset parts C C', a plow-beam pivoted to the part C', a lever H, rigidly mounted on said part, the toothed segments $a$, fastened to the plow-beam concentric with the part C', and the spring-actuated latch $f$, mounted on the lever and adapted to engage the notches of the said segments, substantially as and for the purpose set forth.

2. In a wheeled plow, the combination, with the wheels and the cranked or offset axle journaled therein, of a plow-beam pivoted to one of the parts of said axle, a plow-standard pivoted to said plow-beam at a point in rear of the axle, an operating-lever rigidly fastened to the part of the axle on which the beam is pivoted, a tilting beam having its front end pivoted to said operating-lever and its rear end seated in a slot in the plow-standard, and means for securing the operating-lever at any desired angle to the plow-beam, said tilting beam being formed to slide longitudinally in the slot in the plow-standard, but having no other motion therein.

3. The combination, with the wheels W W' and the axle made up of the offset parts C C,' of a plow-beam pivoted on the part C', a lever H, rigidly fastened to said part, a plow-standard pivoted to the rear end of the plow-beam, a tilting beam G, pivoted at its front end to an operating-lever and having at its rear end a sliding connection with the plow-standard, and a latch and segments forming an adjustable connection of the operating-lever and the plow-beam, substantially as and for the purpose set forth.

4. In a wheeled plow, the combination, with the wheels and an axle journaled therein, of a plow-beam supported by said axle, a plow-standard fastened to said beam in the rear of the axle, and a plow fastened to said standard, the plow being offset from the line of the beam and the point of draft attachment on the beam being correspondingly offset and approximately in line of the plow, substantially as and for the purpose set forth.

5. The combination, with the wheels, the axle, and the plow-beam supported thereby, of a plow pivoted to the beam and made up of the lateral arm J, the vertical neck J', and the vertical bars $j$, together with means, substantially as shown and described, connecting the neck J' of the standard with the plow-beam and regulating the angular position in a vertical plane of the standard with reference to the beam, substantially as and for the purpose set forth.

6. In a plow constructed substantially as described, the combination, with the wheels, of the offset axle, the offset plow-beam pivoted to one of the parts of said axle, and the offset plow-standard pivoted to the rear end of said beam, said axle, beam, and standard being made reversible, whereby they may be combined to form the frame of either a right-hand or a left-hand plow, substantially as and for the purpose set forth.

MARTIN SUGHROUE.

Witnesses:
GEORGE L. HOFFMAN,
JOHN SUGHROUE.